United States Patent
Sugiura et al.

(10) Patent No.: US 7,698,296 B2
(45) Date of Patent: Apr. 13, 2010

(54) CONTENT-REPRODUCING APPARATUS

(75) Inventors: Chikashi Sugiura, Hamura (JP);
Takehiko Isaka, Hachioji (JP); Kimio Miseki, Ome (JP)

(73) Assignee: Kabushiki Kaisha TOSHIBA, Tokyo (JP)

( * ) Notice: Subject to any disclaimer, the term of this patent is extended or adjusted under 35 U.S.C. 154(b) by 469 days.

(21) Appl. No.: 11/699,814

(22) Filed: Jan. 30, 2007

(65) Prior Publication Data
US 2008/0071832 A1    Mar. 20, 2008

(30) Foreign Application Priority Data
Aug. 31, 2006    (JP) .............................. 2006-236855

(51) Int. Cl.
*G06F 7/00* (2006.01)
(52) U.S. Cl. .................................... 707/102; 707/104.1
(58) Field of Classification Search ................. 707/100, 707/104.1; 84/601
See application file for complete search history.

(56) References Cited

U.S. PATENT DOCUMENTS 6,987,221 B2 * 1/2006 Platt ............................ 84/601
2005/0197961 A1 * 9/2005 Miller et al. .................. 705/52
2006/0159109 A1 * 7/2006 Lamkin et al. ............... 370/401
2007/0180476 A1 * 8/2007 Muoio et al. .................. 725/80
2008/0250026 A1 * 10/2008 Linden et al. ................. 707/10

FOREIGN PATENT DOCUMENTS

JP        2003-132085 A       5/2003

* cited by examiner

*Primary Examiner*—Don Wong
*Assistant Examiner*—Angela M Lie
(74) *Attorney, Agent, or Firm*—Frishauf, Holtz, Goodman & Chick, P.C.

(57) ABSTRACT

A content reproducing apparatus includes a display unit configured to display a play list and candidate contents able to be added to the play list, a selection unit configured to select, from the candidate contents, an undesired content which a user does not want to add to the play list, a calculation unit configured to calculate a first retrieval statistical quantity based on first characteristic quantity of the undesired content or a second retrieval statistical quantity based on second characteristic quantity of a desired content which the user wants to add to the play list, and a retrieve unit configured to retrieve the candidate contents to prepare the play list, in accordance with similarity which has been calculated by using the first or second retrieval statistical quantity and which shows to which a given content having third characteristic quantity is similar, the desired content or the undesired content.

13 Claims, 7 Drawing Sheets

<Content displaying unit>     <Candidate content display unit>

| No. | Title |
|---|---|
| 01 | Content A |
| 02 | Content B |
| 03 | Content C |
| 04 | Content D |
| 05 | Content E |
| 06 | Content F |
| 07 | Content G |
| 08 | Content H |
| 09 | Content I |
| 10 | ・・・ |

[Select]

| No. | Title |
|---|---|
| 01 | Content F |
| 02 | Content I |
| 03 | Content B |
| 04 | Content H |
| 05 | Content C |
| 06 | ・・・ |
| 07 | ・・・ |
| 08 | ・・・ |
| 09 | ・・・ |
| 10 | ・・・ |

[Delete]

CONTENT-REPRODUCING APPARATUS

CROSS-REFERENCE TO RELATED APPLICATIONS

This application is based upon and claims the benefit of priority from prior Japanese Patent Application No. 2006-236855, filed Aug. 31, 2006, the entire contents of which are incorporated herein by reference.

BACKGROUND OF THE INVENTION

1. Field of the Invention

The present invention relates to a content-reproducing apparatus.

2. Description of the Related Art

The simplest method of preparing a list (called play list) of a plurality of contents that the user wants to play back, selected from many multimedia contents such as sound, music, still pictures, moving pictures and texts is to use tag information representing the genres, the names of the artists and the dates. With this method, however, it is difficult to prepare a play list in consideration of, for example, a difference in melody that can hardly be represented by tag information.

Jpn. Pat. Appln. KOKAI Publication No. 2003-132085 discloses a method in which a musical work may be retrieved by using a keyword pertaining to sensitivity, such as "cheerful tune," thereby to prepare a play list. To use this method, it is necessary to learn in order to fill the gap between the classification criteria the words of sensitivity have and the impression the user has about the words of sensitivity. As described in Jpn. Pat. Appln. KOKAI Publication No. 2003-132085, this learning is performed by generating fit information if the user plays back a tune to the end and unfit information if the user skips the tune during the playback. These information items are used to make the prepared sensitivity-word table more similar to the user's impression.

However, the impression of any word of sensitivity differs from one user to another. Hence, no sensitivity-word table that agrees with the user's sensitivity can be prepared unless the parameters that control the speed with which the learning progresses have values optimal to each user. Jpn. Pat. Appln. KOKAI Publication No. 2003-132085 does not disclose such a method as would set the parameters to optimal values.

BRIEF SUMMARY OF THE INVENTION

According to a first aspect of the invention, there is provided a content reproducing apparatus comprising: a first display unit configured to display a play list and candidate contents able to be added to the play list; a first selection unit configured to select, from the candidate contents, an undesired content which a user does not want to add to the play list; a calculation unit configured to calculate at least one of a first retrieval statistical quantity based on first characteristic quantity of the undesired content and a second retrieval statistical quantity based on second characteristic quantity of a desired content which the user wants to add to the play list; and a retrieve unit configured to retrieve the candidate contents to prepare the play list, in accordance with similarity which has been calculated by using at least one of the first retrieval statistical quantity and the second retrieval statistical quantity and which shows to which a given content having third characteristic quantity is similar, the desired content or the undesired content.

According to a second aspect of the invention, there is provided a content reproducing apparatus comprising: a first display unit configured to display a play list and candidate contents able to be added to the play list; a first selection unit configured to select, from the candidate contents, an undesired content which an user does not want to add to the play list; a calculation unit configured to calculate at least one of a first retrieval statistical quantity based on first characteristic quantity of the undesired content and a fourth retrieval statistical quantity which is a weighted average of a second retrieval statistical quantity based on second characteristic quantity of a desired content which the user wants to add to the play list and a third retrieval quantity based on a third characteristic quantity of a provisional desired content not selected as the undesired content; and a retrieve unit configured to retrieve the candidate contents to prepare the play list, in accordance with similarity which has been calculated by using at least one of the first retrieval statistical quantity and the fourth retrieval statistical quantity and which shows to which a given content having fourth characteristic quantity is similar, the desired content or the undesired content.

According to a third aspect of the invention, there is provided a content reproducing apparatus comprising: a display unit configured to display a play list and candidate contents being able to be added to the play list; a selection unit configured to select, from the candidate contents, a first content which is prohibited from adding the content list; a calculation unit configured to calculate at least one of a first retrieval statistical quantity based on first characteristic quantity of the first content and a second retrieval statistical quantity based on second characteristic quantity of a second content which is not selected by the selection unit; and a retrieve unit configured to evaluate the similarity between at least one of the first retrieval statistical quantity and the second retrieval statistical quantity and a third characteristic quantity of a content, and to retrieve the candidate contents.

DETAILED DESCRIPTION OF THE INVENTION

Embodiments of the present invention will be described, with reference to the accompanying drawings.

First Embodiment

Figure 1:
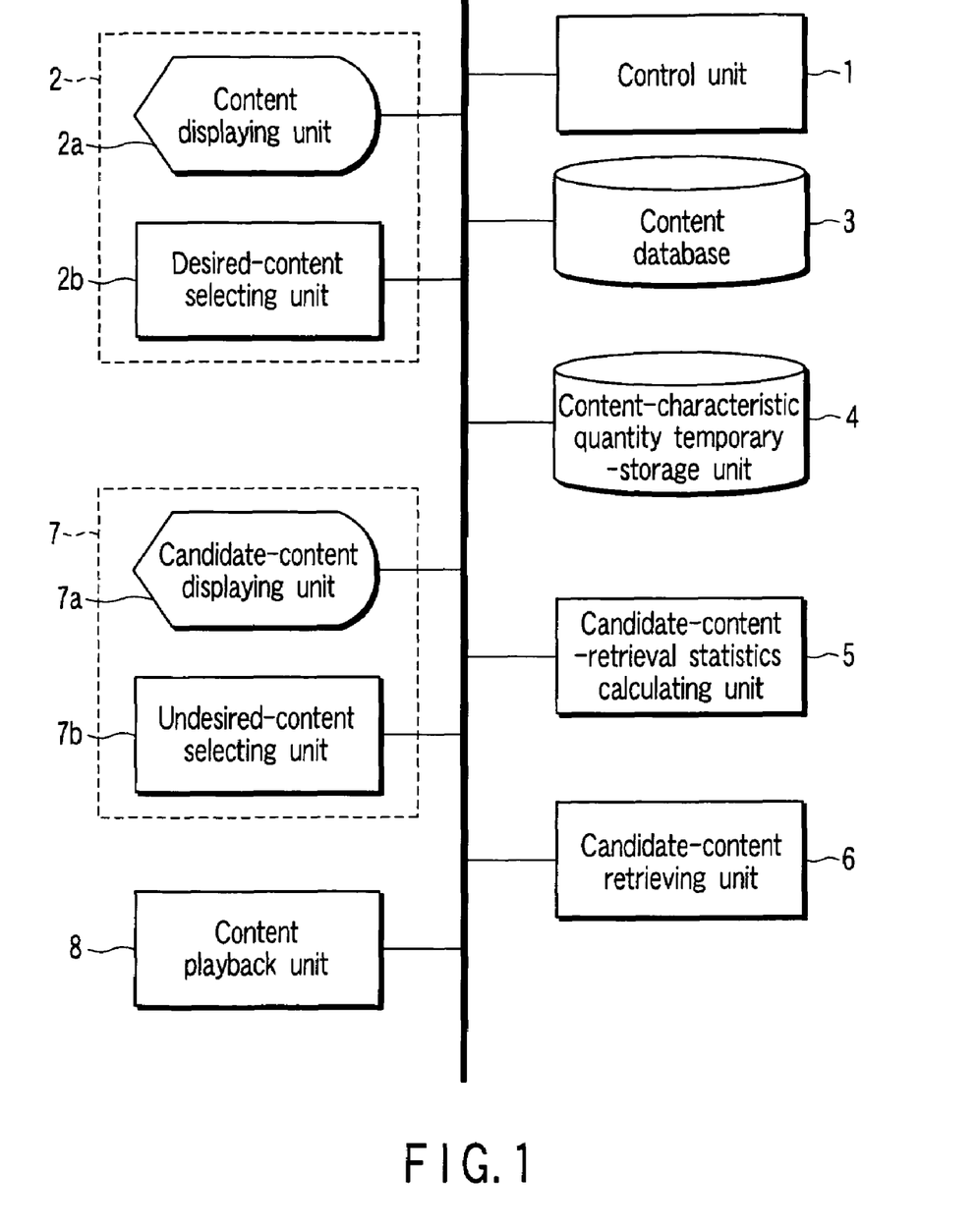
FIG. 1 is a block diagram showing a content reproducing apparatus according to an embodiment of the present invention.

As FIG. 1 shows, a content reproducing apparatus according to an embodiment of the present invention has a control unit 1, a content-displaying interface 2, a content database 3, a content-characteristic quantity temporary-storage unit 4, a candidate-content-retrieval statistics calculating unit 5, a candidate-content retrieving unit 6, a candidate-list displaying unit 7, and a content playback unit 8. These units are connected to one another. The content displaying interface 2 has a content displaying unit 2a and a desired-content selecting unit 2b. The candidate-list displaying unit 7 has a candidate-content displaying unit 7a and an undesired-content selecting unit 7b.

The content database 3 stores the contents that the user possesses, the various bibliographical data items about the contents and the characteristic data items representing the characteristics of the contents, in association with one another. The bibliographical data items may include, for example, content names, genres, playback periods, file volumes, storage schemes, and data items that can identify each content, such as title, artist's name, composer's name, if the content is a musical work. The bibliographical data items about these contents can be referred to in the content database 3 and can be used to determine the user's taste for the contents. The characteristic data is the information that represents the impression and nature of a specific content. It may be, for example, a bibliographical data item related to the attribute of content, such as genre, artist's name, playback period or the like. Each content may be divided into some time frames, and the vector obtained from a physical quantity that can represent the nature of content for each time frame may be used as the characteristic data. For acoustic data, the physical quantity can be frequency spectrum, band power and zero-crossing number. For image data, the physical quantity can be the average luminance or chrominance of the blocks or the difference in average luminance or chrominance between the adjacent block units. For moving pictures, the physical quantity can be the average time-axis difference, variance or histogram of luminance or chrominance for the blocks. Further, the physical quantity may be secondary data obtained from these data items, such as tempo and rhythm for acoustic data, data specifying a night view or an indoor view for image data, and frequency of slow scenes or scene changes for moving pictures. Use of these characteristic quantities makes it possible to prepare a play list that provides titles of contents to a user and reflects the user's taste that cannot be determined from only the bibliographical data items such as content genres. Hereinafter, vectors represented by the above-mentioned physical quantities will be called characteristic quantity vectors.

The content displaying unit 2a displays the contents stored in the content database 3, along with at least one bibliographical data item that the user can use to identify the content. The content name can be exemplified as a bibliographical data item that enables the user to identify by intuition. The user may operate the desired-content selecting unit 2b to select any content he or she wants to add to the play list. The candidate-content-retrieval statistical quantity calculating unit 5 uses the desired content, calculating the retrieval statistical quantities required to retrieve candidate contents that the candidate-content displaying unit 7a should display. The method of calculating the retrieval statistical quantities will be explained later in detail.

The candidate-content retrieving unit 6 retrieves the candidate contents that the candidate-content displaying unit 7a should display. The method of retrieving the candidate contents will be described later in detail. The candidate-content displaying unit 7a displays some or all of the candidate contents the candidate-content retrieving unit 6 has retrieved. Assume that the candidate contents are displayed in the descending order of selection probability. Then, the higher the probability any candidate content has, the higher position it will be displayed at. Hence, the play list can be satisfactory to the user. The candidate contents are generally listed in the descending order of selection probability. Nonetheless, the play list can be randomized in part so that the user may not lose interest in the list. Further, the candidate contents that exceed a preset level of selection probability may be randomized. This may also prevent the user from losing interest in the list.

In accordance with the instruction the user has input, the undesired-content selecting unit 7b selects the candidate contents the user does not want to add to the play list.

How the candidate-content-retrieval statistical quantity calculating unit 5 calculates retrieval statistical quantities will be explained in detail. As described above, the candidate-content-retrieval statistical quantity calculating unit 5 uses the information about the desired contents and undesired contents, thereby to calculate statistical quantities. The statistical quantities will be utilized to determine, in a statistical way, to which a given characteristic quantity vector is similar, the group of the characteristic quantity of desired contents or the group of the characteristic quantities of undesired contents. More precisely, the candidate-content-retrieval statistical quantity calculating unit 5 calculates the average vector μa of the characteristic quantity vectors of all desired contents, a variance matrix Σa of all desired contents, the average vector μb of the characteristic quantity vectors of all undesired contents, and a variance matrix Σb of all undesired contents. Once these statistical quantities have been calculated, the following formula 1 representing the so-called Maharanobis distance is applied to, for example, a given characteristic quantity vector x. The statistical distance Da for the desired contents and the statistical distance Db for the undesired contents can thereby be calculated.

$$D_a = (\mu_a - x)^T \Sigma_a^{-1} (\mu_a - x)$$

$$D_b = (\mu_b - x)^T \Sigma_b^{-1} (\mu_b - x) \tag{1}$$

where "T" means a transported matrix, "−1" means an inverse matrix, as in any formulae that will be presented hereinafter. Using Da and Db, it can be determined to which group the characteristic quantity vector x is similar, the desired contents or the undesired contents, in accordance with the following formula 2:

$D_a - D_b < Th$ then the candidate content is similar to the desired contents.

else the candidate content is similar to the undesired contents. (2)

If the undesired-content selecting unit 7b has not selected any undesired content and only the desired contents can be utilized, the candidate content can be determined to similar or belong to the vectors of the desired contents in accordance with the threshold value for Da, by using the following formula 3:

$D_a < Th_a$ then the candidate content is similar to the desired contents.

else the candidate content is similar to the undesired contents. (3)

Conversely, if the desired-content selecting unit 2b has not selected any desired content and only the undesired contents can be utilized, the candidate content can be determined to similar or belong to the vectors of the desired contents in accordance with the threshold value for Db, by using the following formula 4:

$D_b < Th_b$ then the candidate content is similar to the undesired contents.

else the candidate content is similar to the desired contents. (4)

It is desired that the candidate-content-retrieval statistical quantity calculating unit 5 should calculate statistical quantities for both the desired contents and the undesired contents, rather than for only the desired contents or only the undesired contents. To calculate statistical quantities for the desired contents only, formula 3 is used to determine whether the candidate content is statistically similar to the desired contents. Nevertheless, the optimal value for the threshold Tha can differ from user to user, or from one desired content to another desired content. Similarly, the optimal value for the threshold Thb (in formula 4) can differ from user to user, or from one undesired content to another undesired content, if statistical quantities are calculated for the undesired contents only. If Tha is large or Thb is small, the candidate contents more frequently include undesired contents. Conversely, if Tha is small or Thb is large, the candidate contents more frequently fail to include contents that should be included. In other words, in the case where statistical quantities are calculated for the desired contents only or for the undesired contents only, it is relatively difficult to prepare a play list the user wants, because an optimal value can hardly be set for Tha or Thb. On the other hand, if statistical quantities are calculated for both the desired contents and the undesired contents, the threshold value Th in formula 2 needs only to be set to "0", in general. That is to say, in formula 2, it is easy to determine which the characteristic quantity vector x is similar to, the desired contents or the undesired contents, in accordance with whether the difference between Da and Db has a positive or negative value. Hence, in the case where statistical quantities are calculated for both the desired contents and the undesired contents, it is relatively easy to prepare a play list the user wants, because an optimal value can be easily set for Th in formula 2. p Next, how the candidate-content retrieving unit 6 retrieves the candidate contents will be described in detail. The candidate-content retrieving unit 6 retrieves contents similar to a desired content, contents not similar to an undesired content, or contents similar to the desired content and not similar to the undesired content, from among some or all of the contents stored in the content database 3. More specifically, the candidate-content retrieving unit 6 calculates Da and/or Db from statistical quantities by using formula 1, for the characteristic quantity vector x of a given content stored in the content database 3. Then, using formula 2, formula 3 or formula 4, the unit 6 determines which the characteristic quantity vector x is similar to, the desired content or the undesired content. If the characteristic quantity of the content is composed of "N" characteristic quantity vectors, "N" results will be obtained. The quotient obtained by dividing the number of characteristic quantity vectors x determined to be similar to the desired content by "N" is therefore regarded as the similarity of this content. If the similarity is close to "1.0", the content is similar to the desired content and should be selected as a candidate content. If the similarity is conversely close to "0.0", the content is similar to the undesired content and should not be selected as a candidate content. The candidate-content retrieving unit 6 retrieves any contents that have similarity equal to or greater than a certain value as candidate contents.

It is not statistically determined whether certain content is similar to a desired content or not. Rather, it is determined how much the content is similar to the desired content, thus calculating the similarity of the content. The similarity calculated can be applied as selection probability for the content that may be displayed by the candidate-content displaying unit 7a. The order that content takes in the play list can be varied, as described above, in accordance with the selection probability.

Figure 2:
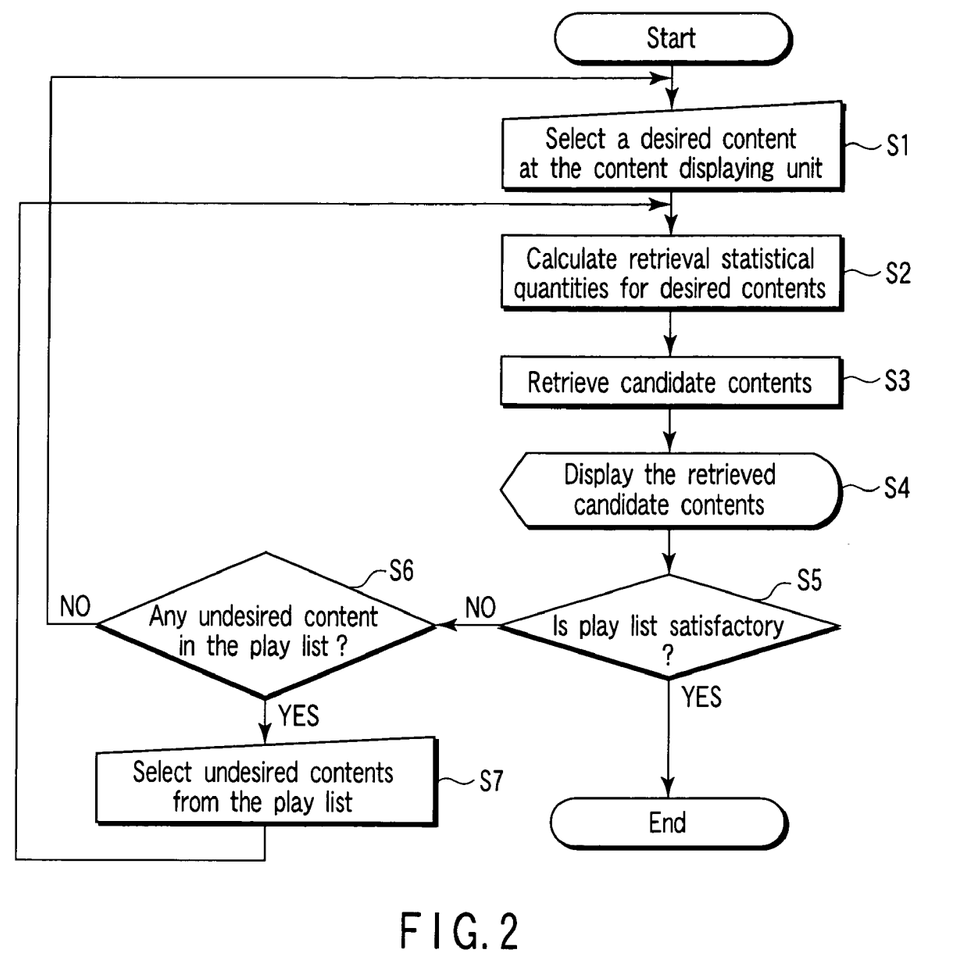
FIG. 2 is a flowchart illustrating the sequence of preparing a play list in the content-displaying apparatus according to a first embodiment of the invention.
Figure 6:
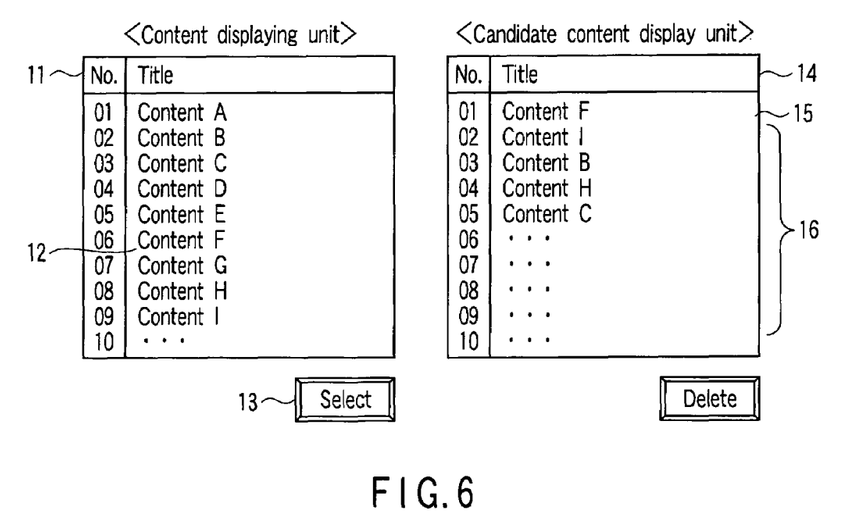
FIG. 6 is a diagram showing an example of a content displaying interface 2 and an example of a candidate-list displaying interface 7, both according to an embodiment of the invention.
Figure 7:
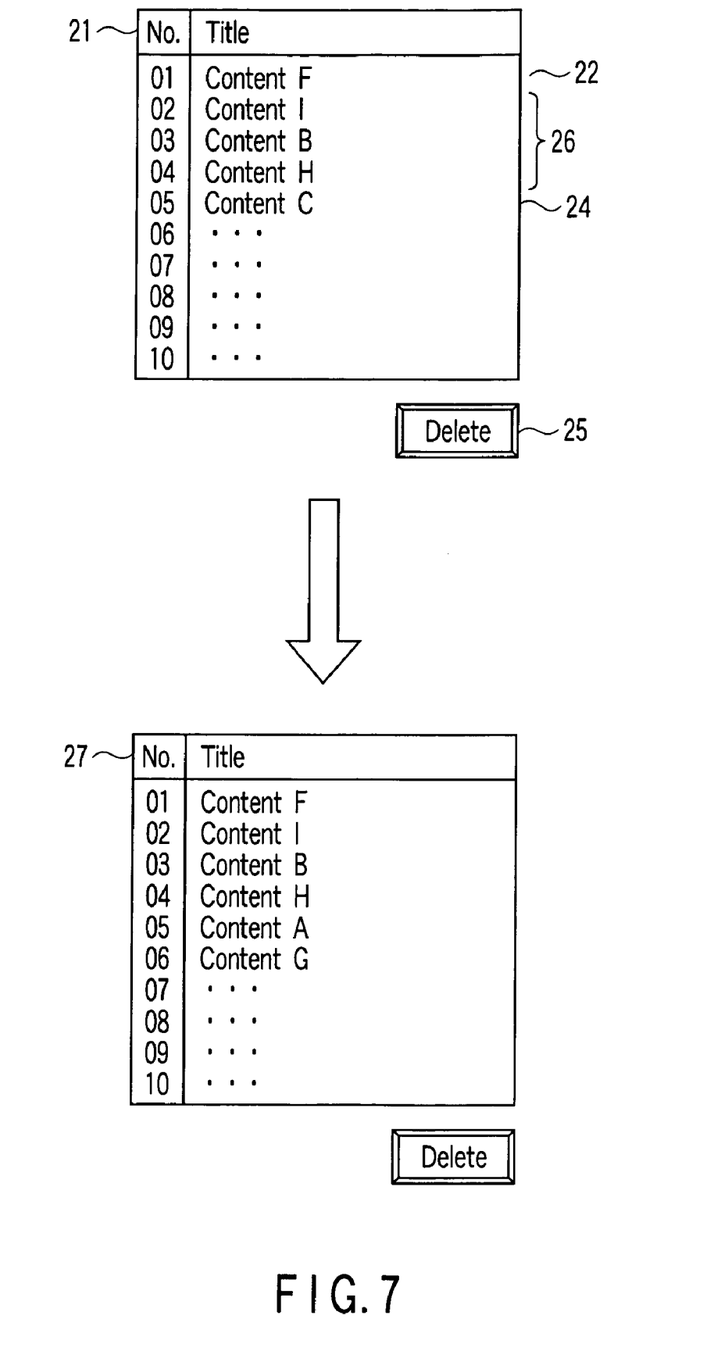
FIG. 7 is a diagram showing an example of a candidate-list displaying interface 7 according to an embodiment of the invention.

The sequence of preparing the play list in the content display apparatus according to the present embodiment will be explained, with reference to the flowchart of FIG. 2, FIGS. 6 and 7 showing examples of interfaces.

The user may operate the desired-content selecting unit 2b, selecting a desired content he or she wants to add to the play list displayed by the content displaying unit 2a(Step S1). More specifically, the user selects "06: Content F" from the contents displayed in a content list 11 and then operates the selection button 13. Next, the candidate-content-retrieval statistical quantity calculating unit 5 calculates statistical quantities in order to retrieve candidate contents that are similar to the desired content (Step S2). Then, the candidate-content retrieving unit 6 retrieves candidate contents that may be added to the play list (Step S3). The candidate-content displaying unit 7a displays a list of the candidate contents as the play list (Step S4). More specifically, the candidate-content displaying unit 7a displays the list of candidate contents as the play list 14. It is determined whether the play list thus displayed satisfies the user (Step S5). If the play list satisfied the user, the process is terminated. If the play list does not satisfy the user, the process goes to Step S6.

In Step S6, it is determined whether the play list shows any undesired content. If the play list shows any undesired content, the process goes to Step S7. Otherwise, the process returns to Step S1, and the above-mentioned process is repeated.

In Step S7, the user operates the undesired-content selecting unit 7b, selecting an undesired content from the play list displayed by the candidate-content displaying unit 7a. Then, the process returns to Step S2, and the above-mentioned process is repeated. To be more specific, the user selects "05: Content C" from the play list 21 displayed by the candidate-content displaying unit 7a and then operates the deletion button 25.

In Step S7, undesired contents are selected from the play list displayed by the candidate-content displaying unit 7a, as the user operates the undesired-content selecting unit 7b. Then, the process returns to Step S2, and the above-mentioned process is repeated. To be more specific, the user selects "05: Content C" from the play list 21 displayed by the candidate-content displaying unit 7a and then operates the deletion button 25.

As explained above, the sequence of steps, described above, is performed in this embodiment in order to update the play list every time the user selects a desired content or an undesired content. A play list satisfactory to the user can therefore be prepared and displayed.

FIG. 7 is a diagram that explains an example of the interface. The interface is not limited this example. The order in which the candidate contents are display may be appropriately changed. Further, the contents 26 that the user has not selected as an undesired content need not be continuously displayed.

Moreover, the characteristic quantities of the desired contents and undesired contents may be stored beforehand in the content-characteristic quantity temporary-storage unit 4, and the candidate-content-retrieval statistical quantity calculating unit 5 may use the characteristic quantities stored in the content-characteristic quantity temporary-storage unit 4. Still further, the content-characteristic quantity temporary-storage unit 4 may store not the characteristic quantities, but the data that can be the key (ID) to the content database 3, which key can specify each of the desired or undesired contents. That is, various characteristic quantities may be used by referring to the content database 3, whenever the candidate-content-retrieval statistical quantity calculating unit 5 needs the characteristic quantities. Then, it is unnecessary to hold the characteristic quantities of the desired contents or the characteristic quantities of the undesired contents. This can save storage region. Further, the content-characteristic quantity temporary-storage unit 4 may store the number of the desired contents and the number of the undesired contents, all used in the candidate-content-retrieval statistical quantity calculating unit 5, or the number of the characteristic quantity vectors, the average of these vectors and the variance matrix. With such a configuration, it is unnecessary to hold the characteristic quantities of the desired contents or the characteristic quantities of the undesired contents. Storage region can therefore be saved. Moreover, the candidate-content-retrieval statistical quantity calculating unit 5 performs weighting on the various averages and variance matrices calculated in the past and the average vector and variance matrices added by the user, in accordance with the number of contents or the number of characteristic quantity vectors, thereby calculating a linear sum. The amount of data that should be computed can be therefore reduced. Furthermore, the content-characteristic quantity temporary-storage unit 4 and the candidate-content-retrieval statistical quantity calculating unit 5 can have some of the functions described above.

Instead of preparing the play list, an input indicating whether the user wants to keep playing back a content may be received, while the content playback unit 8 is playing back the content. This configuration can gradually reduce the playback of the contents undesirable to the user, within a short time and in interactive manner. As a result, the contents desirable to the user can be played back at high frequency.

Any candidate content can be retrieved, not only at the time the user selects a desired content or an undesired content, but also at any time the user designates. With such a configuration, a play list satisfactory to the user can be prepared, not making the user has a stress about the I/F even if the user is a person who may feel strange when the contents displayed change very frequently.

The data already calculated and stored in the content-characteristic quantity temporary-storage unit 4 and the various statistical quantities calculated by the candidate-content-retrieval statistical quantity calculating unit 5 may be stored as dictionary information, in association with appropriate names. In this case, a list of the contents that agree with the names can be displayed as play list only if this dictionary information is selected at the initial stage at which the user uses the content reproducing apparatus. More specifically, a third party prepares a play list of, for example, "cheerful tunes," and the name "cheerful" is stored in a dictionary in association with the statistical quantities calculated by the candidate-content-retrieval statistical quantity calculating unit 5 and the characteristic quantity vectors used in calculating these quantities. Thus, the user only need to select the dictionary titled "cheerful", in order to retrieve the candidate contents from all contents the user possesses, by using the statistical quantities contained in the dictionary titled "cheerful". As a result, the user can have a desirable play list prepared, by performing a very simple operation. While the play list is being displayed after the dictionary has been selected, the user may select desired contents or undesired contents. Then, the user can eliminate the discrepancy between the play list prepared on the basis of a dictionary prepared beforehand and the impression he or she actually has about the play list.

The example in which a dictionary is used has the problem that a play list desirable to the user cannot be obtained at once if the user's sensitivity differs from that of the third person. Nevertheless, the user may prepare the dictionary for him. In other words, the user may store a dictionary name representing the image of this dictionary, together with the retrieval statistical quantities and the characteristic quantity vectors of the contents used to calculate the retrieval statistical quantities.

Further, the desired-content selecting unit 2b may select undesired contents, in the same way as the undesired-content selecting unit 7b selects undesired contents. Similarly, the undesired-content selecting unit 7b may select desired contents. If this is the case, the operation is identical to the operation performed when the desired-content selecting unit 2b selects desired contents. To perform these operations in practice, a function may be added, which provides a button "O" for selecting desired contents and a button "X" for selecting undesired contents. With such a configuration, the user can prepare a play list more smoothly, by performing few steps of operation.

In FIG. 1, the content displaying interface 2 and the candidate-list displaying interface 7 are illustrated as separate units. They can be united, nonetheless, into a single display unit. That is, they share one content displaying unit and use different display fonts for the contents to be displayed by this displaying unit, thus distinguishing the content information to be displayed by the content displaying unit 2a from the content information to be displayed by the candidate-content displaying unit 7a. With such a configuration, only one content displaying unit can prepare a play list that agrees with the user's taste for interfaces. The display unit can indeed be replaced by two display devices. However, one display device can be operated as if it were two display devices.

The user may thus select desired contents so that a play list may be automatically prepared. Then, it is possible to reduce the gap between the play list the user wants and the play list that has been automatically prepared, said discrepancy resulting from the discrepancy between the impression the user actually has about the play list and the classification criteria that words, such as "cheerful," have. Moreover, a play list desirable to the user can be automatically prepared for a short time, because candidate contents are retrieved every time the user selects desired contents and undesired contents. The user can select and delete any content he or she wishes to delete from the play list, every time the play list is displayed. The user can therefore confirm, in an interactive way, that the play list is changing to a list he or she wants to have.

As has been described above, the statistical distance Da for the desired contents and the statistical distance Db for the undesired contents are calculated by utilizing the concept of Maharanobis distance in order to make statistical decisions. Nonetheless, they can be calculated by any other method than the one based on Maharanobis distance, as long as statistical decisions can be accomplished.

Second Embodiment

In this embodiment, the candidate-content-retrieval statistical quantity calculating unit 5 calculates statistical quantities by using provisional desired contents. The provisional desired contents and the operation of the candidate-content-retrieval statistical quantity calculating unit 5 will be explained, mainly on what is different from the first embodiment described above.

First, it will be explained what are provisional desired contents are, with reference to FIG. 7. Assume that the content 22 displayed at the top of the play list 21 showing candidate contents is the desired content that the user has selected at the desired-content selecting unit 2b. The user can select an undesired content. He or she may first designate the content 24 and then operate the deletion button 25, thereby to select the content 24 as an undesired content. In this case, the second to fourth contents 26 the user has not selected as undesired contents are possibly contents the user wants to add to the play list. These contents are herein defined as provisional desired contents.

How the candidate-content-retrieval statistical quantity calculating unit 5 calculates statistical quantities will be explained in detail. To calculate the statistical quantities, the candidate-content-retrieval statistical quantity calculating unit 5 uses not only the characteristic quantities of such desired contents and undesired contents as mentioned above, but also the characteristic quantities of provisional desired contents. The statistical quantities are utilized in order to statistically determine which a given characteristic quantity vector is similar to, a group of the desired contents and the provisional desired contents or a group of the undesired contents. To be more specific, the candidate-content-retrieval statistical quantity calculating unit 5 calculates the average vector $\mu a$ of the characteristic quantity vectors of all desired contents, a variance matrix $\Sigma a$ of all desired contents, the average vector $\mu c$ of the characteristic quantity vectors of all desired contents and all provisional desired contents, a variance matrix $\Sigma c$ of all desired and all provisional desired contents, the average vector $\mu b$ of the characteristic quantity vectors of all undesired contents, and a variance matrix $\Sigma b$ of all undesired contents. Next, $\mu a$, and $\mu c$ are synthesized and $\Sigma a$ and $\Sigma c$ are synthesized, by using the following formula 5. New statistical quantities $\mu d$ and $\Sigma d$ are thereby provided.

$$\mu_d = (1-k)\mu_a + k\mu_c$$

$$\Sigma_d = (1-k)\Sigma_a + k\Sigma_c \qquad (5)$$

where k is a learning coefficient that controls the degree to which the provisional desired contents influence the statistical quantity calculated by the candidate-content-retrieval statistics calculating unit 5. The closer the learning coefficient k is to "0.0", the less the provisional desired contents influence the statistical quantity. The farther the learning coefficient k is from "0.0", the more the provisional desired contents influence the statistical quantity. If a provisional desired content is relatively similar to a desired content, the learning coefficient k can be set to a value much different from "0.0". If the learning coefficient k is set to a value much different from "0.0", however, there will be many candidate contents that are undesirable to the user in the case where the provisional desired content are relatively similar to an undesired content. Hereinafter, this result will be called excessive learning. To avoid the excessive learning, the learning coefficient must be set to an optimal value. The coefficient k is optimal if provisional desired contents make up for insufficiency of desired contents as much as possible, thereby to prevent the excessive learning. In other words, the learning coefficient k is optimal if it as much different from "0.0" as possible and errors in discriminating desired contents from undesired contents do not increase.

Figure 3:
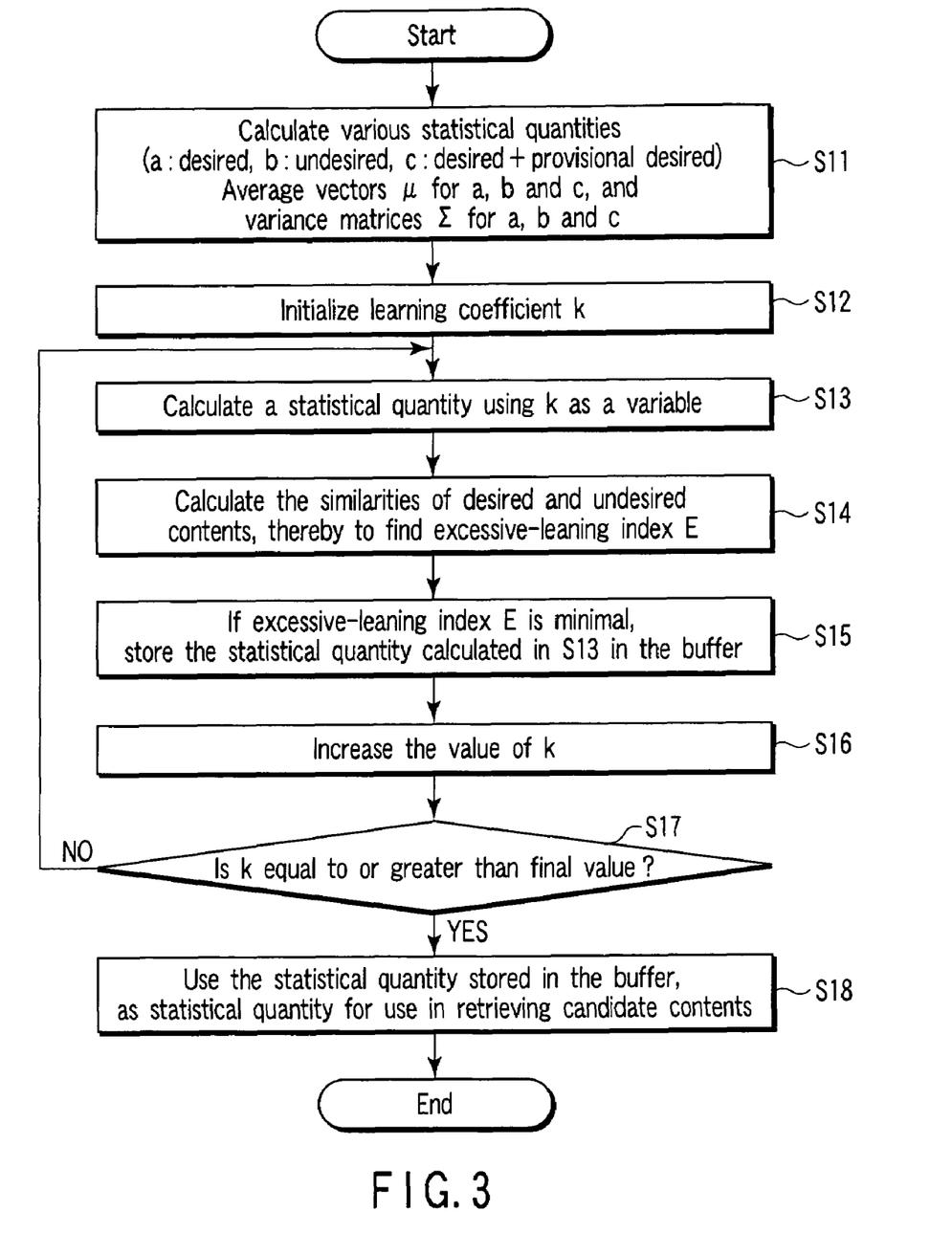
FIG. 3 is a flowchart illustrating the sequence of searching for a value optimal for a learning coefficient k applied in the candidate-content-retrieval statistics calculating unit 5 provided according a second embodiment of the invention.

The process sequence of the candidate-content-retrieval statistics calculating unit 5 will be described with reference to the flowchart of FIG. 3, as to how the unit 5 searches for an optimal value for the learning coefficient k.

First, average vectors $\mu a$, $\mu b$ and $\mu c$ for the desired contents, the undesired contents and the provisional desired contents, respectively, and the valiance matrices $\Sigma a$, $\Sigma b$ and $\Sigma c$ for the desired contents, the undesired contents and the provisional desired contents, respectively are calculated (Step S11). Next, the learning coefficient k is initialized to, for example, "0.0" (Step S12). Further, a statistical quantity using the learning coefficient k as a variable is calculated as expressed by the formula 5 (Step S13). Here, no provisional desired contents are applied if the coefficient k is "0.0", and all provisional desired contents are applied if the coefficient k is "1.0". The learning coefficient k is gradually increased from "0.0" to "1.0", each time by about "0.1". Learning is thereby performed, preventing increase of an excessive-learning index E, i.e., the indicator showing whether the learning is excessive or not. The excessive-learning index E will be described later. Next, the similarities that contents have with respect to a desired content and an undesired content, respectively, are calculated. On the basis of these similarities, indices E1 and E2, which will be described later, are calculated, thereby obtaining the excessive-learning index E (Step S14). E1 has a reference value when k="0.0" and may be either a decrease in similarity to a desired content or a decrease in the number of contents that are similar to the desired content. E2 has a reference value when k="0.0". It may be either an increase in similarity to an undesired content or an increase in the number of contents similar to the undesired content. The excessive-leaning index E is calculated by finding a weighted average of the indices E1 and E2, as seen from the following formula 6.

$$E = wE1 + (1-w)E2 \qquad (6)$$

In the formula 6, w is a weight. The closer to "0.0", w is, the more greatly an error is weighted, which is content similar to an undesired content is contained as candidate content. The closer to "1.0", w is, the more greatly an error is weighted, which is content similar to a desired content is not contained as candidate content. Therefore, w should better be as small as possible, in order to prepare a play list that the user may find, by intuition, a satisfactory one. The method of calculating the similarity is almost the same as the method of the formula 1 to 4 set forth above. In the present embodiment, however, the following formula 7 is utilized in place of the formula 1.

$$D_d = (\mu_d - x)^T \Sigma_d^{-1} (\mu_d - x)$$

$$D_b = (\mu_b - x)^T \Sigma_b^{-1} (\mu_b - x) \qquad (7)$$

Next, the statistical quantity calculated in Step S13 is stored in a buffer if the excessive-leaning index E is smaller than a predetermined threshold value and smaller than the minimum value obtained thus far (Step S15). Then, the value of k is increased by, for example, "0.1" (Step S16). It is then determined whether the value of k is equal to or greater than "1.0" (Step S17). If the value of k is less than the final value, the process returns to Step S13. Otherwise, the process goes to Step S18. In Step S18, the statistical quantity stored in the buffer at present is output from the candidate-content-retrieval statistics calculating unit 5. The process sequence is thus terminated.

Figure 8:
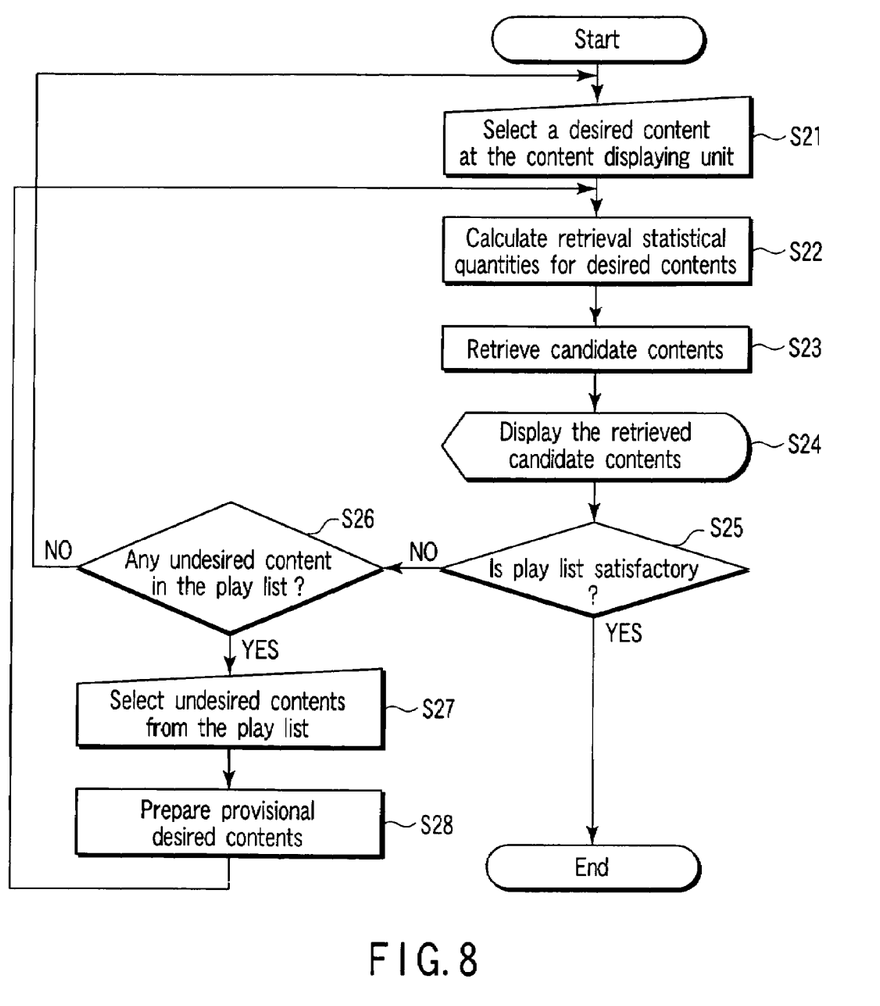
FIG. 8 is a flowchart illustrating the sequence of preparing a play list in a content-displaying apparatus according to a second embodiment of the present invention.

The process sequence that the content reproducing apparatus according to this embodiment performs to prepare a play list will be explained, with reference to the flowchart of FIG. 8 and the interfaces shown in FIGS. 6 and 7.

The user operates the desired-content selecting unit 2b, selecting content he or she wants to add to the play list, from the contents displayed by the content displaying unit 2a. (Step S21). More specifically, the user first selects "06: Content F" from the contents displayed in the content list 11 and then operates the selection button 13. Next, the candidate-content-retrieval statistical quantity calculating unit 5 calculates statistical quantities in order to retrieve candidate contents that are similar to the desired content (Step S22). Then, the candidate-content retrieving unit 6 retrieves candidate contents (Step S23). The candidate-content displaying unit 7a displays a list of the candidate contents as the play list (Step S24). To be more specific, the candidate-content displaying unit 7a displays the list of candidate contents as the play list 14. It is determined whether the play list thus displayed satisfies the user (Step S25). If the play list satisfied the user, the process is terminated. Otherwise, the process goes to Step S26.

In Step S26, it is determined whether the play list displayed at present shows any undesired content. If the play list shows any undesired content, the process goes to Step S27. Otherwise, the process returns to Step S21.

In Step S27, the user operates the undesired-content selecting unit 7b, selecting an undesired content from the play list displayed by the candidate-content displaying unit 7a. To be more specific, the user selects "05: Content C" 24 from the play list 21 displayed by the candidate-content displaying unit 7a and then operates the deletion button 25. Next, the candidate contents that have not been deleted as undesired contents in Step S27 are used as provisional desired contents, and the process returns to Step 22 (Step S28). More specifically, the contents 26 displayed between "05: Content C" 24 that has been selected as an undesired contents and "01: Content F" that is a desired content are used as a provisional desired contents in the case described above.

As in the first embodiment, the content-characteristic quantity temporary-storage unit 4 may store the information that the candidate-content-retrieval statistical quantity calculating unit 5 requires in order to calculate desired contents and undesired contents and to calculate statistical quantities for the desired contents and provisional desired contents. Further, the content playback unit 8 may be used to play back contents, without preparing a play list. Further, dictionaries may be prepared or used. Still further, the desired-content selecting unit 2b may select undesired contents, and the undesired-content selecting unit 7b may select desired contents. Moreover, the content displaying interface 2 and the candidate-list displaying interface 7 may be implemented as a single display unit.

An undesired content may be selected from a group of contents, each having some similarity. In this case, the remaining contents of the group may be used as provisional contents. Assume that these contents are musical works and that the similarity pertains to the artists performing the works. Then, once some of the works played by a certain artist have been selected as undesired contents, the remaining works are used as provisional desired contents. Therefore, contents that can be used as provisional contents can be increased in numbers, in accordance with the information that shows how the user has selected contents. A play list that the user wants can therefore be prepared by performing a few operations.

When an optimal learning coefficient k is searched for and obtained by such a method as described above, a play list that the user wants can be prepared with higher precision, while not adversely influenced by the excessive learning.

Figure 4:
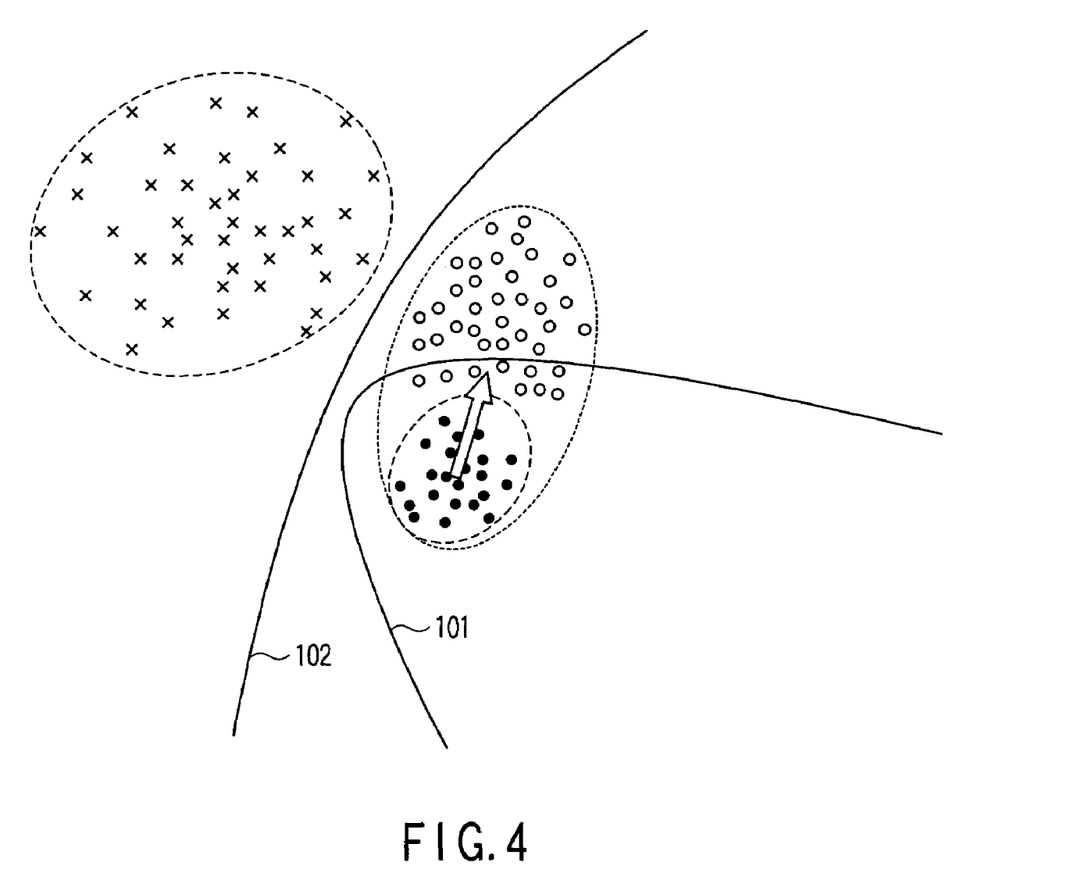
FIG. 4 is a diagram depicting an example of discrimination.
Figure 5:
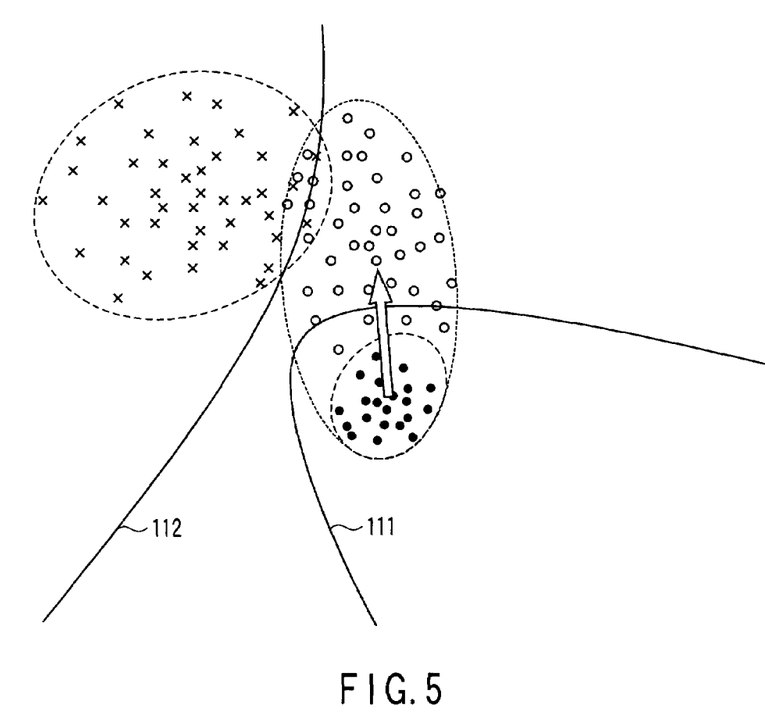
FIG. 5 is a diagram depicting another example of discrimination.

Next, images of discrimination will be explained with reference to FIGS. 4 and 5. FIG. 4 shows the case where provisional desired contents can positively be included in the group of desired contents (i.e., the case where the excessive-leaning index E does not increase). FIG. 5 shows the case where provisional desired contents should not be positively included in the group of desired contents (i.e., the case where the excessive-leaning index E increases). In FIGS. 4 and 5, ●, x and ○ represent the characteristic quantity vector of a desired content, the characteristic quantity vector of an undesired content, and the characteristic quantity vector of a provisional desired content, respectively.

In the case shown in FIG. 4, a discrimination border 101 for k of "0.0" (k="0.0") is drawn between the characteristic quantity vectors x of undesired contents and the characteristic quantity vectors ● of desired contents if the provisional desired contents are not included in the group of desired contents. If the provisional contents are fully included in the group of desired contents, a discrimination border 102 for k of "1.0" (k="1.0") is drawn between the characteristic quantity vectors x of undesired contents and the group of characteristic quantity vectors ● of desired contents and characteristic quantity vectors 0 of provisional desired contents. As shown in FIG. 4, neither the characteristic quantity vectors x of undesired contents nor the characteristic quantity vectors ● of desired contents lie beyond the discrimination border 102. No errors are therefore made near the discrimination border 102. Hence, no problem will arise if the provisional contents are positively included in the group of desired contents in order to calculate statistical quantities.

In the case shown in FIG. 5, a discrimination border 111 for k of "0.0" (k="0.0") is drawn between the characteristic quantity vectors x of undesired contents and the characteristic quantity vectors ● of desired contents if the provisional desired contents are not included in the group of desired contents. If the provisional desired contents are fully included in the group of desired contents, a discrimination border 112 for k of "1.0" (k="1.0") is drawn between the characteristic quantity vectors x of undesired contents and the group of characteristic quantity vectors ● of desired contents and characteristic quantity vectors ○of provisional desired contents. In this case, however, some of the characteristic quantity vectors x of undesired contents lie beyond the discrimination border 112. Errors are inevitably made near the discrimination border 112. Errors will probably increase in numbers, ultimately causing excessive learning, if the provisional desired contents are positively included in the group of desired contents.

As has been described above, candidate contents are retrieved in this embodiment, every time the user selects a desired content and an undesired content, and provisional desired contents are included in the group of desired contents, thereby preparing a play list. A play list that the user wants can therefore be automatically and reliably prepared within a relatively short time. Further, the user can confirm, in an interactive way, that the play list is changing to the very list he or she wants to have, only by selecting and delete contents to delete from the play list, every time the play list is displayed.

Third Embodiment

In the second embodiment, the candidate-content-retrieval statistical quantity calculating unit 5 calculates statistical quantities, using provisional desired contents, whereby a play list can be prepared performing a few operations. In this embodiment, the contents which have not been selected as desired contents are used as provisional undesired contents in the candidate-content-retrieval statistical quantity calculating unit 5, whereby statistical quantities are calculated.

Provisional undesired contents are thus provided. These provisional undesired contents make up for insufficiency of undesired contents in the case where the undesired contents are fewer than the desired contents that are available.

As in the second embodiment, when the undesired-content selecting unit 7b selects any desired content displayed on the candidate-content displaying unit 7a, any content displayed above the selected desired content may be used as a provisional undesired content. Assume that the user selects contents that he or she wants to add to the list, sequentially from the top thereof (to keep them displayed in the list). Then, any content not selected as a desired content is potentially considered an undesired content and is therefore used as a provisional undesired content. Alternatively, any content displayed below the desired content on the candidate-content displaying unit 7a, which has just been selected at the undesired-content selecting unit 7b, may be used as a provisional undesired content. That is, the lower a content assumes in the list, the lower selection probability it has and the more likely it may be an undesired content. Hence, it is used as a provisional undesired content. Assume that the contents that have not been selected at the desired-content selecting unit 2b may include some contents that have some similarity, and a desired content may be selected from the contents having the similarity. In this case, the remaining contents having the similarity can be used as provisional undesired contents. As has been explained in conjunction with the second embodiment, contents that can be used as provisional undesired contents are increased in numbers, in accordance with the information that shows how the user has selected contents. A play list that the user wants can therefore be prepared by performing a few steps of operations.

As has been described, the use of provisional undesired contents makes it possible to prepare a play list desirable to the user, both reliably and quickly, though the kinds of contents selected depend on the user's taste. Further, not only the provisional undesired contents, but also provisional desired contents used in the second embodiment, may be used. If this is the case, a play list desirable to the user can be prepared more reliably and more quickly, by performing few steps of operation.

The object of an embodiment of this invention is to prepare a play list that the user wants. Nonetheless, a play list that the user does not want may be prepared, too. Then, the user can know what kinds of contents he or she does not like.

Moreover, the apparatus may comprise an input device that can prepare a play list that is totally reverse to the play list automatically prepared. In this case, the user may be released from the stereotyped fashion of enjoying the contents.

Additional advantages and modifications will readily occur to those skilled in the art. Therefore, the invention in its broader aspects is not limited to the specific details and representative embodiments shown and described herein.

What is claimed is:

1. A content reproducing apparatus comprising:
    a display unit configured to display at least one of a play list, candidate content items which can be added to the play list, and prepared content items;
    a selection unit configured to select, from the candidate content items, undesired content items which a user does not want to add to the play list and/or, from the prepared content items, desired content items which the user wants to add to the play list;
    a calculation unit configured to calculate at least one of a first retrieval statistical quantity based on first characteristic quantities of all of the undesired content items and a second retrieval statistical quantity based on second characteristic quantities of all of the desired content items; and
    a retrieve unit configured to retrieve the candidate content items to prepare the play list, in accordance with a similarity which has been calculated by using at least one of the first retrieval statistical quantity and the second retrieval statistical quantity, and which shows as to what a given content item having a third characteristic quantity is similar to, the desired content items or the undesired content items;
    wherein the calculation unit calculates at least one of an average vector of the first characteristic quantities as the first retrieval statistical quantity, and an average vector of the second characteristic quantities as the second retrieval statistical quantity.

2. The apparatus according to claim 1, further comprising a database which stores the prepared content items, at least one bibliographical data item for identifying the prepared content items and characteristic quantities of the prepared content items, all associated with one another, and
    wherein the display unit displays the prepared content items and the corresponding associated at least one bibliographical data item, and displays the candidate content items and a corresponding associated at least one bibliographical data item.

3. The apparatus according to claim 1, wherein the retrieve unit retrieves the candidate content items, in accordance with at least one of a first statistical distance between the first retrieval statistical quantity and the third characteristic quantity, and a second statistical distance between the second retrieval statistical quantity and the third characteristic quantity.

4. The apparatus according to claim 3, wherein the first statistical distance and the second statistical distance are Maharanobis distances.

5. A content reproducing apparatus comprising:
    a display unit configured to display at least one of a play list, candidate content items which can be added to the play list, and prepared content items;
    a selection unit configured to select, from the candidate content items, undesired content items which a user does not want to add to the play list, and/or, from the prepared content items, desired content items which the user wants to add to the play list;
    a calculation unit configured to calculate at least one of a first retrieval statistical quantity based on first characteristic quantities of all of the undesired content items, and a fourth retrieval statistical quantity which is a weighted average vector of a second retrieval statistical quantity based on second characteristic quantities of all of the desired content items and a third retrieval statistical quantity based on third characteristic quantities of provisional desired content items not selected as the undesired content items; and
    a retrieve unit configured to retrieve the candidate content items to prepare the play list, in accordance with a similarity which has been calculated by using at least one of the first retrieval statistical quantity and the fourth retrieval statistical quantity, and which shows as to what a given content item having a fourth characteristic quantity is similar to, the desired content items or the undesired content items;

wherein the calculation unit calculates at least one of: (i) an average vector of the first characteristic quantities as the first retrieval statistical quantity, and (ii) an average vector of the second characteristic quantities as the second retrieval statistical quantity, and an average vector of the third characteristic quantities as the third retrieval statistical quantity.

6. The apparatus according to claim 5, further comprising a database which stores the prepared content items, at least one bibliographical data item for identifying the prepared content items, and characteristic quantities of the prepared content items, all associated with one another, and wherein the display unit displays the prepared content items and the corresponding associated at least one bibliographical data item, and displays the candidate content items and a corresponding associated at least one bibliographical data item.

7. The apparatus according to claim 5, wherein the retrieve unit retrieves the candidate content items, in accordance with at least one of a first statistical distance between the first retrieval statistical quantity and the fourth characteristic quantity, and a second statistical distance between the fourth retrieval statistical quantity and the fourth characteristic quantity.

8. The apparatus according to claim 7, wherein the first statistical distance and the second statistical distance are Maharanobis distances.

9. A content reproducing apparatus comprising:

a display unit configured to display a play list and candidate content items which can be added to the play list;

a selection unit configured to select, from the candidate content items, first content items which are prohibited from being added to the play list;

a calculation unit configured to calculate at least one of a first retrieval statistical quantity based on first characteristic quantities of all of the first content items, and a second retrieval statistical quantity based on second characteristic quantities of all second content items which are not selected by the selection unit; and a retrieve unit configured to evaluate a similarity between: (i) at least one of the first retrieval statistical quantity and the second retrieval statistical quantity, and (ii) a third characteristic quantity of a content item, and to retrieve the candidate content items;

wherein the calculation unit calculates at least one of an average vector of the first characteristic quantities as the first retrieval statistical quantity, and an average vector of the second characteristic quantities as the second retrieval statistical quantity.

10. The apparatus according to claim 9, wherein the display unit further displays the retrieved content items.

11. The apparatus according to claim 9, further comprising a database which stores the retrieved content items with a corresponding bibliographical data item for identifying the retrieved content items, and a corresponding characteristic quantity, wherein the display unit is configured to display the retrieved content items, the candidate content items, and the corresponding associated bibliographical data item.

12. The apparatus according to claim 9, wherein the retrieve unit retrieves the candidate content items, in accordance with at least one of a first statistical distance between the first retrieval statistical quantity and the third characteristic quantity, and a second statistical distance between the second retrieval statistical quantity and the third characteristic quantity.

13. The apparatus according to claim 12, wherein the first statistical distance and the second statistical distance are Maharanobis distances.

* * * * *